United States Patent
Schwan et al.

(10) Patent No.: US 7,426,935 B2
(45) Date of Patent: Sep. 23, 2008

(54) METHOD OF DISCHARGING HIGH PRESSURE STORAGE VESSELS

(75) Inventors: Mirko Schwan, Mittenaar (DE); Holger Winkelmann, Mainz-Kastel (DE); Wolfgang Oelerich, Wiesbaden (DE)

(73) Assignee: GM Global Technology Operations, Inc., Detroit, MI (US)

( * ) Notice: Subject to any disclaimer, the term of this patent is extended or adjusted under 35 U.S.C. 154(b) by 554 days.

(21) Appl. No.: 11/105,740

(22) Filed: Apr. 14, 2005

(65) Prior Publication Data

US 2006/0231144 A1    Oct. 19, 2006

(51) Int. Cl.
F17C 13/04    (2006.01)
F17C 7/00    (2006.01)

(52) U.S. Cl. .............. 137/266; 137/263; 137/255; 137/601.14; 137/601.2

(58) Field of Classification Search .............. 137/263, 137/265, 266, 572, 601.14, 601.2; 429/25
See application file for complete search history.

(56) References Cited

U.S. PATENT DOCUMENTS

| | | | | |
|---|---|---|---|---|
| 3,289,694 A | * | 12/1966 | Elliott et al. ............. | 137/601.2 |
| 3,559,678 A | * | 2/1971 | Donner ..................... | 137/601.2 |
| 3,762,431 A | * | 10/1973 | Wilson et al. ............... | 137/263 |
| 6,708,718 B2 | * | 3/2004 | Yamada et al. ............. | 137/266 |
| 7,067,212 B2 | * | 6/2006 | Willimowski et al. ......... | 429/25 |

* cited by examiner

*Primary Examiner*—John Rivell

(57) ABSTRACT

A master/slave tank system for storing a compressed hydrogen gas, where the system employs an electrically driven shut-off valve for each tank in the system. The tank system includes a master tank and a slave tank for storing the gas. A first line is coupled to the master tank for providing the gas stored therein to a fuel cell stack. A master tank shut-off valve is positioned in the first line between the master tank and a pressure regulator. A second line is coupled to the slave tank for providing the gas stored therein to the master tank as the pressure difference between the slave tank and the master tank changes. An electrically driven slave tank shut-off valve is positioned within the second line, where the slave tank shut-off valve automatically closes the second line in response to an increase in the differential pressure across the slave tank valve.

22 Claims, 3 Drawing Sheets

METHOD OF DISCHARGING HIGH PRESSURE STORAGE VESSELS

BACKGROUND OF THE INVENTION

1. Field of the Invention

This invention relates generally to a storage tank system for storing a high pressure gas and, more particularly, to a storage tank system for storing a high pressure gas, where the tank system includes a master tank having a master tank shut-off valve and at least one slave tank having a slave tank shut-off valve, and where the slave tank shut-off valve has a low pressure differential so that a rupture or leak will cause it to automatically close.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines. In an automotive fuel cell application, the hydrogen fuel is sometimes stored in a high pressure tank system on the vehicle. In one particular design, the tank system includes a master tank and at least one slave tank.

FIG. 1 is a schematic plan view of a compressed hydrogen gas master/slave tank system 10 of a type known in the art for this purpose. The tank system 10 includes a master tank 12 and a slave tank 14. A valve protection filter 16 is positioned within the master tank 12 so that fuel from the tank 12 flowing through an output line 18 to a fuel cell stack (not shown) is free of contaminants. The pressure within the master tank 12 and the slave tank 14 may be upwards of 70 MPa. A first high pressure regulator 20 and a second high pressure regulator 22 are positioned in the line 18, where the regulators 20 and 22 reduce the pressure of the hydrogen gas in the tank 12 in steps to a usable pressure by the fuel cell stack. A low pressure electrically driven solenoid shut-off valve 24 is positioned in the line 18 downstream from the pressure regulators 20 and 22, where the valve 24 closes off the line 18.

When hydrogen gas is drawn from the master tank 12 during operation of the fuel cell stack, it is replenished by hydrogen gas from the slave tank 14 on line 30 so that the pressure within the tanks 12 and 14 remains substantially the same. A flow controller 32 is positioned within the line 30 to control the flow of the hydrogen gas from the slave tank 14 to the master tank 12. The flow controller 32 remains open unless the gas flow exceeds a predetermined maximum flow rate, possibly indicating a leak or rupture in the line 30, where the controller 32 will be closed. A manual shut-off valve 34 is positioned within the line 30 downstream from the flow controller 32 so that the tank 14 can be manually shut off to prevent hydrogen gas from flowing therefrom for servicing and the like.

A thermal activated pressure release valve 40 is positioned within a line 42 that is coupled to the master tank 12, and a thermal activated pressure relief valve 44 is positioned within a line 46 that is coupled to the slave tank 14. The valves 40 and 44 are normally closed, but are automatically opened if the temperature around the master tank 12 and the slave tank 14, respectively, exceeds a predetermined maximum temperature. Particularly, if the temperature does exceed the predetermined maximum temperature, the valves 40 and 44 are automatically opened to release the pressure within the tanks 12 and 14 to the environment for safety purposes.

When the tanks 12 and 14 need to be refueled, a refueling line (not shown) is coupled to a refueling coupler 50. The hydrogen gas flows from the refueling coupler 50 into a line 52 through a filter 54 that removes particulates therefrom. The line 52 is coupled to the line 30 so that both the master tank 12 and the slave tank 14 are simultaneously filled with the hydrogen gas. A check valve 56 in the line 52 prevents backflow of the hydrogen gas into the coupler 50 when the slave tank 14 is supplying the master tank 12 with hydrogen gas during operation of the fuel cell stack. Further, a check valve 58 in the line 30 prevents the hydrogen gas from flowing through the line 30 from the master tank 12.

As discussed above, the low pressure shut-off valve 24 is positioned downstream of the pressure regulators 20 and 22 in a low pressure part of the line 18. The slave tank 14 does not include a solenoid operated shut-off valve. Regulations in certain countries require automatic shut-off valves to be positioned proximate to the master tank 12 and the slave tank 14 that will automatically shut off in the event of a line rupture for safety purposes.

FIG. 2 is a schematic diagram of a known compressed hydrogen gas master/master tank system 64 that includes system components to address the requirement mentioned above. The tank system 64 includes two tanks 66 and 68 that may both be considered master tanks. Compressed hydrogen gas from the tank 66 for a fuel cell stack (not shown) is output on line 70 and compressed hydrogen gas from the tank 68 for the fuel cell stack is output on line 72. The lines 70 and 72 are combined into a single line 74. A high pressure regulator 76 is positioned in the line 70 for the tank 66, and a high pressure regulator 78 is positioned in the line 72 for the tank 68. Another pressure regulator 80 is positioned in the line 74 for a second pressure regulation step for both of the tanks 66 and 68. A filter 84 is provided in the line 70 to filter the hydrogen gas from the tank 66 and a filter 86 is provided in the line 72 to filter the hydrogen gas from the tank 68.

In this design, an electrically driven solenoid shut-off valve 88 is provided in the line 70 between the pressure regulators 76 and 80, and an electrically driven solenoid shut-off valve 90 is provided in the line 72 between the pressure regulators 78 and 80. The valves 88 and 90 are mid-pressure valves because they are positioned at a pressure location between the pressure regulators 76 and 78 and the second pressure regulator 80. Because the valves 88 and 90 are positioned at a location where the differential pressure across the valve 88 and 90 is relatively high, the electrical energy required to maintain the valves 88 and 90 in the open position against the differential pressure is also relatively high. If a leak or rupture occurs, the differential pressure across the shut-off valve will increase, and the electrically energy will not be enough to maintain the valve in the open position. Thus, it will automatically close. However, these high differential pressure shut-off valves add significant cost and complexity to the system 64. A low-pressure electrically driven solenoid shut-off valve 92 is positioned downstream of the pressure regulator 80.

The tanks 66 and 68 are refueled on line 94 through a refueling coupler 96. A filter 98 filters the hydrogen gas coming into the system 64. A check valve 100 in the line 94 prevents the hydrogen gas from the tanks 66 and 68 from going back through the coupler 96, and check valves 102 and 104 prevent the hydrogen gas from the tanks 66 and 68, respectively, from going into the other tank 66 or 68 on the line 94. A thermal activated pressure relief valve 106 is provided in a relief line 108 for the tank 66, and a thermal activated pressure relief valve 110 is provided in relief line 112 for the tank 68.

SUMMARY OF THE INVENTION

In accordance with the teachings of the present invention, a master/slave tank system for storing a compressed gas, such as hydrogen, is disclosed that employs an automatic shut-off valve for each tank in the system. The tank system includes a master tank and at least one slave tank for storing the gas. A first line is coupled to the master tank for providing the gas stored therein to a gas using device, such as a fuel cell stack. At least one pressure regulator is provided in the first line between the master tank and the gas-using device. A master tank shut-off valve is positioned in the first line between the master tank and the pressure, regulator, where the master tank shut-off valve automatically closes the first line in response to a gas leak in the first line, or closes the first line during normal operating conditions, such as system shut-down. A second line is coupled to the slave tank for providing the gas stored therein to refuel the master tank as the pressure difference between the slave tank and the master tank changes when the gas is output from the master tank on the first line. A slave tank shut-off valve is positioned within the second line, where the slave tank shut-off valve automatically closes the second line in response to a gas leak in the second line, or closes the second line during normal operating conditions. Because the differential pressure across the slave tank shut-off valve is low, minimal electrical energy is required to maintain the valve in the open position, and a relatively small increase in the differential pressure across the slave tank shut-off valve, as a result of a line rupture or leak, will cause the valve to automatically close.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a master/slave tank system for storing a compressed gas is merely exemplary in nature, and is in no way intended to limit the invention or its applications or uses. Particularly, the discussion herein describes the tank system for storing compressed hydrogen gas for a fuel cell system on a vehicle. However, the tank system of the invention has other applications for storing other gases for other systems, including natural gas.

Figure 1:
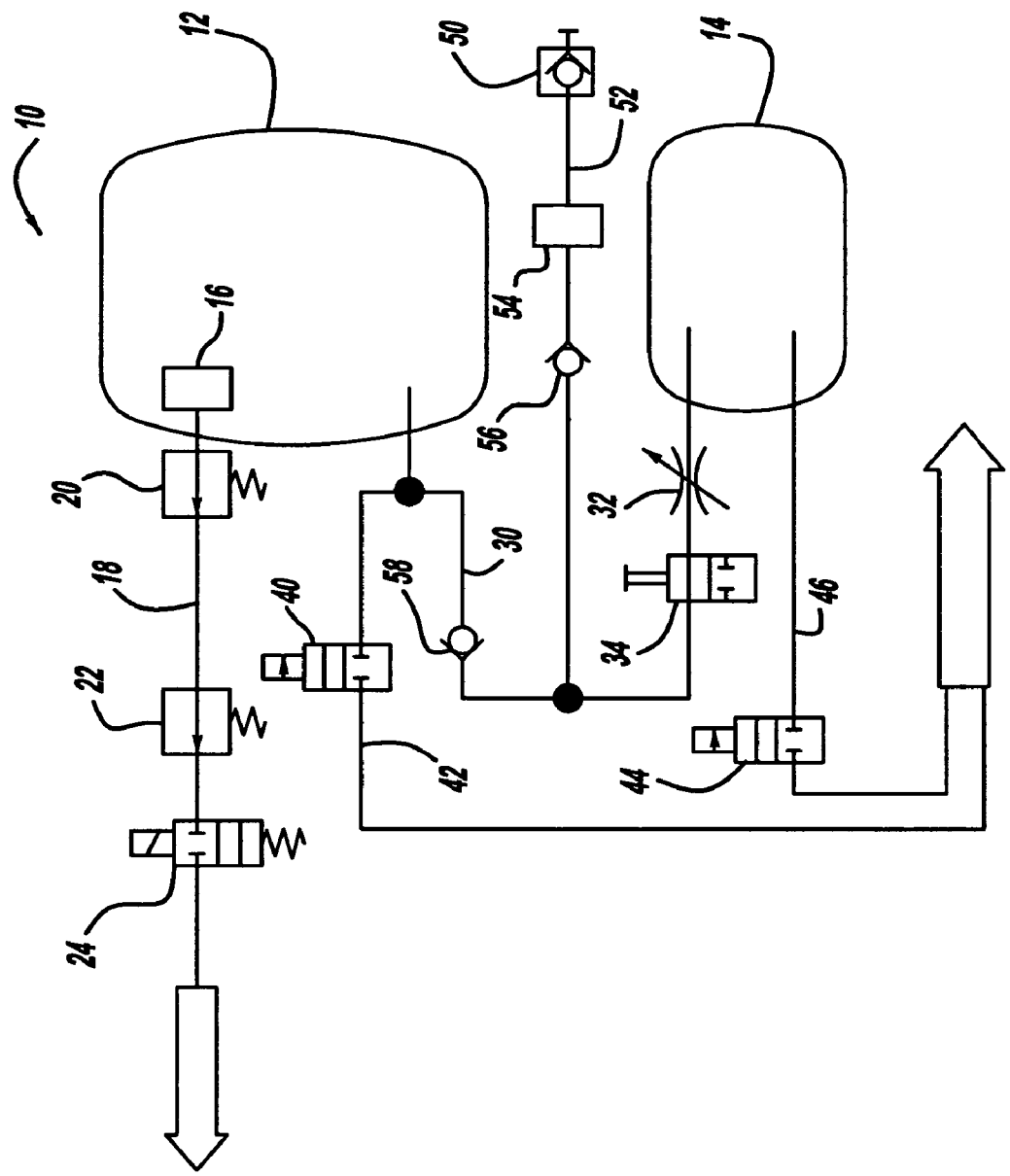
FIG. 1 is a schematic plan view of a known master/slave compressed gas tank system.
Figure 2:
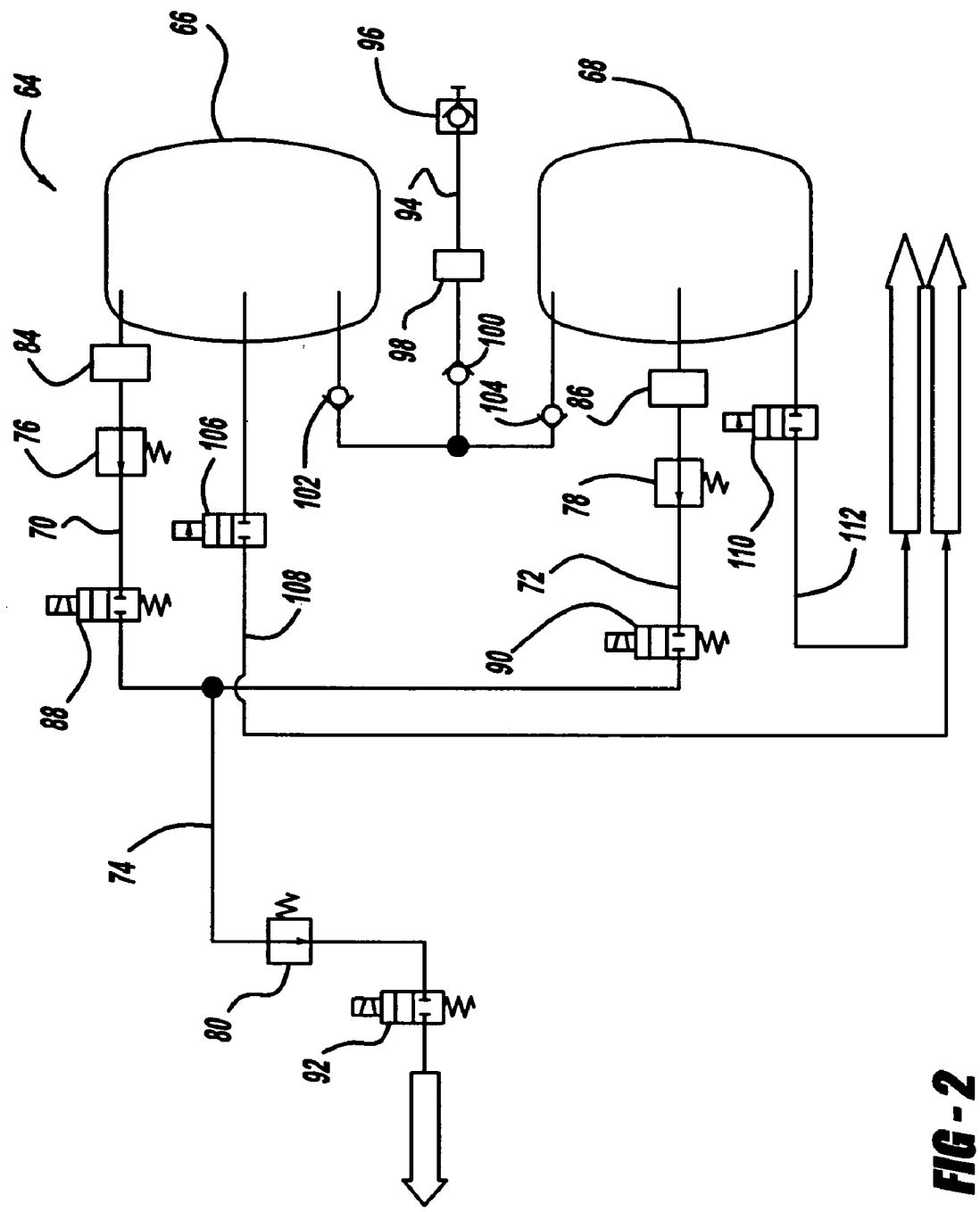
FIG. 2 is a schematic plan view of a known master/master compressed gas tank system.
Figure 3:
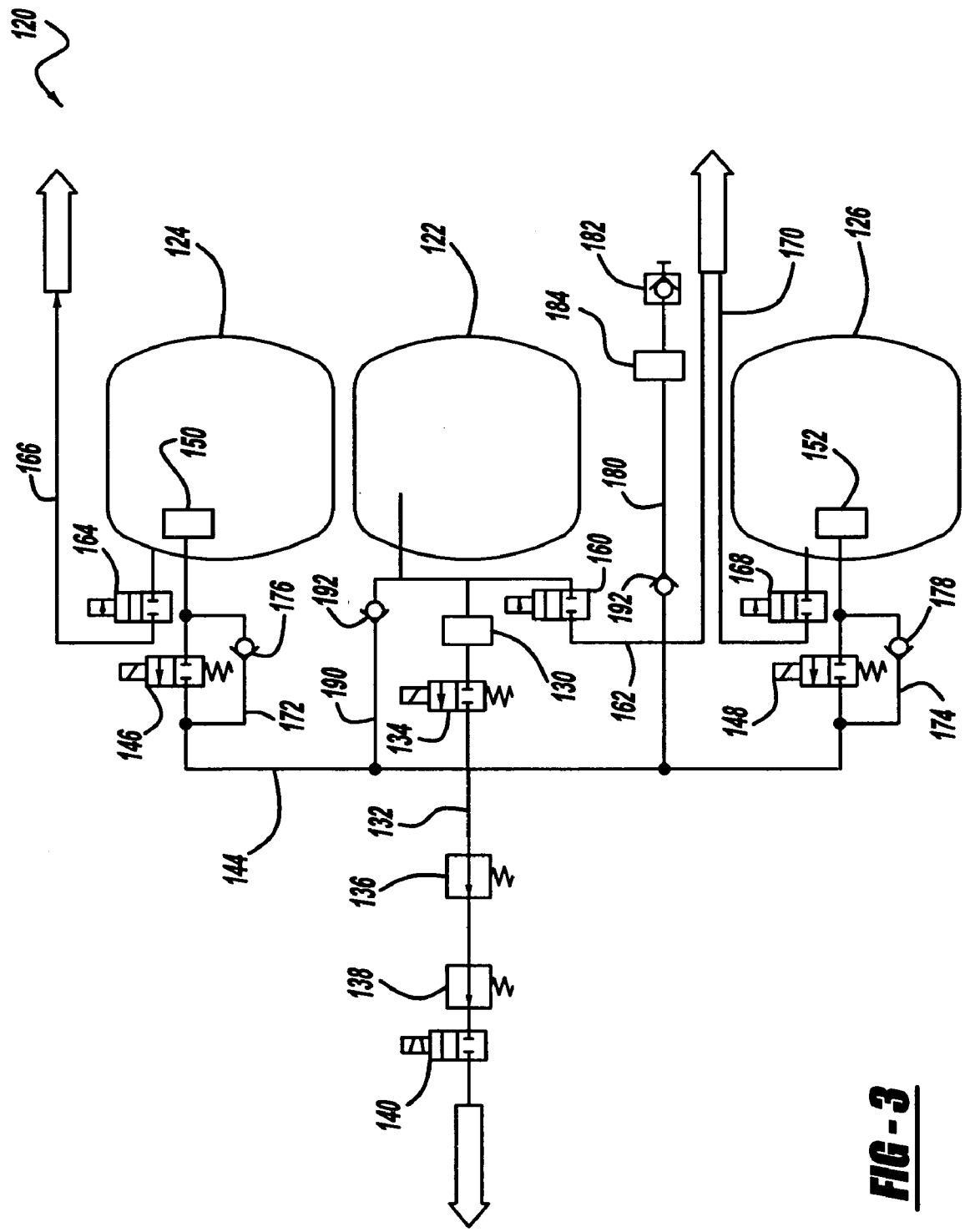
FIG. 3 is a schematic plan view of a master/slave compressed gas tank system including shut-off valves for each tank in the tank system, according to an embodiment of the present invention.

FIG. 3 is a schematic plan view of a master/slave tank system 120 including a master tank 122, a first slave tank 124 and a second slave tank 126, according to an embodiment of the present invention. The tank system 120 is similar to the tank system 10 in that the hydrogen gas for a fuel cell stack (not shown) is provided from the master tank 122, and the slave tanks 124 and 126 feed the master tank 122 to stabilize the pressure in all three of the tanks 122-126. The hydrogen gas from the master tank 122 is output from the tank 122 through a filter 130 on line 132 to the fuel cell stack. An electrically driven solenoid master tank shut-off valve 134 is positioned in the line 132 proximate to the master tank 122 upstream from a first pressure regulator 136 and a second pressure regulator 138 in the line 132. The pressure regulators 136 and 138 step down the gas pressure from the master tank 122 in two steps. A low pressure shut-off valve 140 is provided downstream from the second regulator 138 in the line 132.

According to the invention, the master tank shut-off valve 134 satisfies the requirement in some countries that a shut-off valve be located proximate the tank 122 for added safety purposes. The upstream side of the valve 134 is at master tank pressure and the downstream side of the valve 134 is at a significantly lower pressure and could be at atmospheric pressure. Therefore, there is a large differential pressure across the valve 134, where significant electrical energy is required to maintain the valve 134 in the open position. The system 120 will include various pressure sensors, temperature sensors, hydrogen sensors, etc. to determine if a leak in the line 132 occurs, where the valve 134 will be automatically shut off.

Hydrogen gas from the slave tanks 124 and 126 is sent to the master tank 122 on line 144 through filters 150 and 152, respectively. An electrically driven solenoid slave tank shut-off valve 146 is provided in the line 144 adjacent to the slave tank 124 and an electrically driven solenoid slave tank shut-off valve 148 is provided in the line 144 adjacent to the tank 126. In this configuration, the differential pressure across the valves 146 and 148 is low because the pressure on both sides of the valves 146 and 148 will be about the same because the pressure in the tanks 122-126 is about the same. Therefore, minimal electrical energy is required to maintain the valves 146 and 148 in the open position. However, the housing of the valves 146 and 148 must be fairly robust because of the high pressure that could exist in the tanks 122-126. If a rupture or leak in the line 144 occurs downstream of the valves 146 and 148, then the differential pressure across the valves 146 and 148 will increase as a result of the increased gas flow. This differential pressure will be great enough to automatically close the valves 146 and 148 against the relatively small electrical current applied to the solenoids. Thus, the valves 146 and 148 are automatically shut off in the event of a hydrogen leak. Therefore, only the master tank shut-off valve 134 is required to operate against a high differential pressure.

By providing the shut-off valves 134, 146 and 148 discussed above, the system 120 provides improved safety during parking and driving, provides active and automatic control of the valves 146 and 148 in an emergency situation, and reduces the electrical power necessary to operate the valves 146 and 148.

The shut-off valves 146 and 148 replace the combination of the flow controller 32 and the manual shut-off valve 34 in the known tank system 10, and provide the electronically and automatically controlled shut-off capability necessary for those countries that require automatic shut-off valves close to each tank in the tank system.

A thermal activated pressure relief valve 160 is provided in a line 162 coupled to the master tank 122, a thermal activated pressure relief valve 164 is provided in a line 166 coupled to the slave tank 124 and a thermal activated pressure relief valve 168 is provided in a line 170 coupled to the slave tank 126 to provide the high pressure relief. The tanks 122, 124 and 126 are filled through the line 144, where the shut-off valves 146 and 148 are by-passed on a line 172 and a line 174, respectively. A check valve 176 is positioned in the line 172 and a check valve 178 is positioned in the line 174 to prevent the hydrogen gas from the tanks 124 and 126, respectively, from by-passing the shut-off valves 146 and 148, respectively. In an-alternate embodiment, each shut-off valve 146 and 148 is part of a shut-off valve assembly that includes a check valve for this purpose.

A filling line 180 coupled to the line 144 provides a flow of the hydrogen gas from a refueling coupler 182 for refueling purposes. A filter 184 filters the hydrogen gas being input into the system 120, and a check valve 186 prevents the hydrogen gas stored in the tanks 122, 124 and 126 from entering the refueling coupler 182. A line 190 coupled to the line 144 allows the master tank 122 to be refueled without using the line 132. A check valve 192 prevents the flow of the hydrogen gas from the master tank 122 through the line 190.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A master/slave tank system comprising:
a master tank for storing a gas;
at least one slave tank for storing the gas;
a first line coupled to the master tank for providing the gas stored within the master tank to a gas-using device;
at least one pressure regulator positioned in the first line between the master tank and the gas-using device;
a master tank shut-off valve positioned in the first line between the master tank and the at least one pressure regulator;
a second line for providing the gas stored within the at least one slave tank to the master tank, wherein the at least one slave tank provides the gas to the master tank on the second line as the pressure difference between the slave tank and the master tank changes when the gas is output from the master tank on the first line; and
an electrically driven solenoid slave tank shut-off valve positioned within the second line, wherein a differential pressure across the slave tank shut-off valve is relatively low, said slave tank shut-off valve automatically closing the at least one slave tank in response to an increased differential pressure across the slave tank shut-off valve that overcomes an electrical signal applied to the valve.

2. The system according to claim 1 wherein the at least one pressure regulator is two pressure regulators positioned in the first line, wherein the master tank shut-off valve is positioned in the first line upstream of the pressure regulator closest to the master tank.

3. The system according to claim 1 wherein the at least one slave tank is at least two slave tanks coupled to the second line, wherein each slave tank includes a an electrically driven solenoid slave tank shut-off valve that automatically closes the respective slave tank in response to an increased differential pressure across the slave tank-shut-off valve, wherein the differential pressure across the slave tank shut-off valve is relatively low.

4. The system according to claim 1 further comprising a third line and a fourth line both in fluid communication with the second line, said third line being a refueling line for refueling the master tank through the second line and the fourth line and refueling the at least one slave tank through the second line.

5. The system according to claim 4 further comprising a check valve positioned within a by-pass line provided around the slave tank shut-off valve, said check valve allowing the refueling gas to by-pass the slave tank shut-off valve on the by-pass line during refueling and preventing the gas that supplies the master tank from by-passing the slave tank shut-off valve.

6. The system according to claim 4 wherein the slave tank shut-off valve is part of a shut-off valve assembly that includes a check valve that allows the refueling gas to by-pass the slave tank shut-off valve during refueling and preventing the gas that supplies the master tank from by-passing the slave tank shut-off valve.

7. The system according to claim 1 further comprising a low pressure shut-off valve positioned in the first line between the at least one pressure regulator and the gas-using device.

8. The system according to claim 1 further comprising a first thermal activated pressure relief valve positioned in a third line coupled to the master tank and a second thermal activated pressure relief valve positioned in a fourth line coupled to the at least one slave tank.

9. The system according to claim 1 wherein the gas is compressed hydrogen.

10. The system according to claim 9 wherein the gas-using device is a fuel cell stack.

11. The system according to claim 10 wherein the fuel cell stack in part of a fuel cell system on a vehicle.

12. A master/slave tank system for storing hydrogen gas for a fuel cell stack, said system comprising:
a master tank for storing the gas;
at least one slave tank for storing the gas;
a first line coupled to the master tank for providing the gas stored within the master tank to the fuel cell stack;
a first pressure regulator and a second pressure regulator positioned in the first line between the master tank and the fuel cell stack, said first pressure regulator being closer to the master tank than the second pressure regulator;
an electrically driven master tank shut-off valve positioned in the first line between the master tank and the first pressure regulator, wherein a differential pressure across the master tank shut-off valve could be relatively high based on the tank pressure;
a second line coupled to the at least one slave tank for providing the gas stored within the at least one slave tank to the master tank, wherein the at least one slave tank provides the gas to the master tank on the second line as the pressure difference between the slave tank and the master tank changes when the gas is output from the master tank on the first line; and
an electrically driven slave tank shut-off valve positioned within the second line, wherein a differential pressure across the slave tank shut-off valve is relatively low, said slave tank shut-off valve automatically closing the at least one slave tank in response to an increased differential pressure across the slave tank shut-off valve.

13. The system according to claim 12 wherein the at least one slave tank is at least two slave tanks coupled to the second line, wherein each slave tank includes an electrically driven slave tank shut-off valve that automatically closes in response to an increase in the differential pressure across the slave tank shut-off valve.

14. The system according to claim 12 further comprising a third line and a fourth line in fluid communication with the second line, said third line being a refueling line for refueling the master tank through the second line and the fourth line and refueling the at least one slave tank through the second line.

15. The system according to claim 14 further comprising a check valve positioned within a by-pass line provided around the slave tank shut-off valve, said check valve allowing the refueling gas to by-pass the slave tank shut-off valve on the by-pass line during refueling and preventing the gas that supplies the master tank from the at least one slave tank from by-passing the slave tank shut-off valve.

16. The system according to claim 14 wherein the slave tank shut-off valve is part of a shut-off valve assembly that includes a check valve that allows the refueling gas to by-pass the slave tank shut-off valve during refueling and preventing the gas that supplies the master tank from by-passing the slave tank shut-off valve.

17. The system according to claim 12 further comprising a low pressure shut-off valve positioned in the first line between the second pressure regulator and the fuel cell stack.

18. The system according to claim 12 further comprising a first thermal activated pressure relief valve positioned in a third line coupled to the master tank and a second thermal activated pressure relief valve positioned in a fourth line coupled to the at least one slave tank.

19. A master/slave tank system comprising:
a first tank for storing a gas;
a second tank for storing the gas;
a first line coupled to the first tank for providing the gas stored within the first tank to a gas-using device;
at least one pressure regulator positioned in the first line between the first tank and the gas-using device;
a first electrically driven solenoid shut-off valve positioned in the first line between the first tank and the at least one pressure regulator; and
a second elecrically driven solenoid shut-off valve positioned within a second line proximate to the second tank, wherein a differential pressure across the second shut-off valve is relatively low, said second shut-off valve automatically closing the second line in response to a gas leak and an increased differential pressure across the second shut-off valve that overcomes an elecrical signal applied to the second shut-off valve.

20. The system according to claim 19 further comprising a third line and a fourth line in fluid communication with the second line, said third line being a refueling line for refueling the first tank through the second line and the fourth line and refueling the second tank through the second line.

21. The system according to claim 20 further comprising a check valve positioned within a by-pass line around the second shut-off valve, said check valve allowing the refueling gas to by-pass the second shut-off valve on the by-pass line during refueling.

22. The system according to claim 19 wherein the gas is compressed hydrogen and the gas-using device is a fuel cell stack.

* * * * *